June 11, 1929.                B. P. HOFFMAN                1,716,961
                               STUFFING BOX
                            Filed Dec. 20, 1926
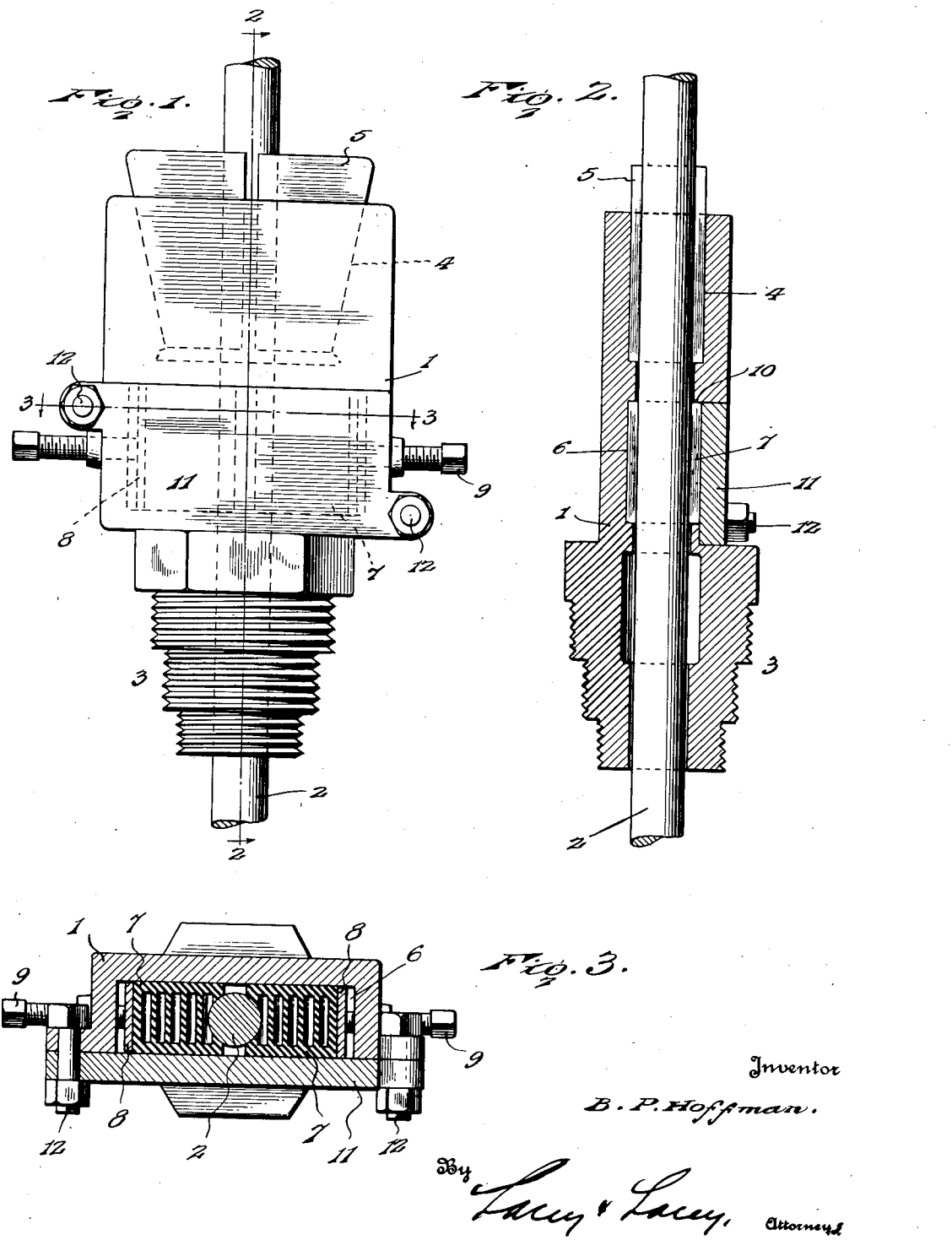
Inventor
B. P. Hoffman.
By Lacey & Lacey, Attorneys Patented June 11, 1929.

1,716,961

UNITED STATES PATENT OFFICE.

BENJAMIN P. HOFFMAN, OF TULSA, OKLAHOMA, ASSIGNOR TO THE PIERCE DEVELOPMENT COMPANY, OF TULSA, OKLAHOMA, A CORPORATION OF OKLAHOMA.

STUFFING BOX.

Application filed December 20, 1926. Serial No. 156,012.

Oil well apparatus includes a stuffing box for closing the end of the oil pipe and this stuffing box receives a packing which is subjected to wear and requires replacement. Usually the stuffing box is formed in sections to admit of the packing being placed in position or removed when worn. The meeting faces of the sections must be machined to insure a tight joint and such machining is expensive. Moreover, considerable difficulty and loss of time are experienced in replacing a worn packing.

The present invention provides in effect a one-piece stuffing box, thereby obviating the expense of machining necessary in providing a sectional stuffing box, as well as facilitating the replacement of worn packing. In accordance with the invention, the stuffing box has a side opening leading from the packing receiving recess and a cover plate closes said opening and retains the packing in place. It will thus be understood that advantage is taken of such arrangement to utilize the packing to maintain a tight joint between the box and cover plate to prevent leakage.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of a stuffing box for oil well tubing, embodying the invention.

Figure 2 is a vertical sectional view on the line 2—2 of Figure 1.

Figure 3 is a horizontal sectional view on the line 3—3 of Figure 1.

Corresponding and like parts are referred to in the following description and designated in the several views of the drawings by like reference characters.

The numeral 1 designates a stuffing box for closing the upper end of the tube or pipe of an oil well and through which an element 2, such as a polish rod or operating cable is adapted to operate. The stuffing box is shown as provided with a stepped coupling end 3, whereby it is adapted for use in connection with different sized tubes or pipes. However, it is to be understood that the box may be formed with any accustomed type of coupling end. The upper end of the box 1 is provided with a recess 4 to receive clamps 5 for holding the element 2 when it is required to adjust the valves or for any other required purpose. A recess 6 is formed within the body of the box to receive the packing 7 and followers 8, whereby the packing is advanced by set screws 9 as the packing wears. The set screws 9 are threaded into opposite sides of the box and their inner ends engage the followers 8.

An opening 10 is formed in a side of the box and leads outwardly from the packing receiving recess 6 to admit of the packing being easily, quickly and conveniently placed in position, or removed, as occasion may require. A cover plate 11 closes the opening 10 and is retained in place by means of bolts 12 passing through corresponding ears formed on the box and cover plate. The plate 11 serves to retain the packing 7 in place and while a tight joint is obtained by a close fit of the parts, nevertheless advantage may be taken to obtain a close joint by means of the packing, as will be readily understood. When the cover plate 11 is removed the recess 6 is exposed, thereby admitting of the packing being placed in position or worn packing readily removed to be replaced by new packing. It is observed that the packing may be renewed at any time without disturbing the stuffing box, said renewal being accomplished by removing the cover plate 11 and substituting a new packing for the worn packing, after which the cover plate is replaced and made secure by retightening the bolts 12. The operation is effected in an extremely short interval of time and with the greatest ease and convenience, and does not require disturbance of the stuffing box or the separation thereof as is necessary when replacing the packing of the usual sectional form of stuffing box.

Having thus described the invention, I claim:

A stuffing box comprising an integral body formed with a shaft passage and intermediate its ends being recessed from one side to form an open-sided packing receiving pocket intersecting said passage and having opposed end walls and a side wall joining the end walls, pressure-exerting screws threaded through the opposed end walls into the pocket, a cover plate for closing the open side of the pocket, and means to removably secure said cover plate in closing relation to the open side of the pocket.

In testimony whereof I affix my signature.

BENJAMIN P. HOFFMAN. [L. S.]